(12) United States Patent
Bouvet et al.

(10) Patent No.: US 12,732,820 B2
(45) Date of Patent: Sep. 8, 2026

(54) METHOD FOR MANAGING A PHASE FOR REQUESTING PAIRING OF DATA PROCESSING DEVICES

(71) Applicant: Orange, Issy-les-Moulineaux (FR)

(72) Inventors: Eric Bouvet, Chatillon Cedex (FR); Fabrice Fontaine, Chatillon Cedex (FR)

(73) Assignee: Orange, Issy-les-Moulineaux (FR)

( * ) Notice: Subject to any disclaimer, the term of this patent is extended or adjusted under 35 U.S.C. 154(b) by 669 days.

(21) Appl. No.: 17/910,433

(22) PCT Filed: Mar. 4, 2021

(86) PCT No.: PCT/FR2021/050368
§ 371 (c)(1),
(2) Date: Sep. 9, 2022

(87) PCT Pub. No.: WO2021/181030
PCT Pub. Date: Sep. 16, 2021

(65) Prior Publication Data

US 2023/0156474 A1 May 18, 2023

(30) Foreign Application Priority Data

Mar. 10, 2020 (FR) ....................................... 2002354

(51) Int. Cl.
*H04W 12/50* (2021.01)
*H04W 12/06* (2021.01)
(Continued)

(52) U.S. Cl.
CPC ........... *H04W 12/50* (2021.01); *H04W 12/06* (2013.01); *H04W 12/61* (2021.01); *H04W 76/11* (2018.02); *H04W 76/38* (2018.02)

(58) Field of Classification Search
CPC ..... H04W 12/50; H04W 12/06; H04W 12/61; H04W 76/11; H04W 76/38; H04W 12/086; H04L 63/1441; H04L 63/1416
(Continued)

(56) References Cited

U.S. PATENT DOCUMENTS

2008/0220746 A1* 9/2008 Ekberg .................... H04M 3/16 455/414.1
2009/0045970 A1* 2/2009 Miyabayashi ......... G08C 17/02 340/4.3
(Continued)

FOREIGN PATENT DOCUMENTS

WO 2018118182 A1 6/2018

OTHER PUBLICATIONS

English translation of the Written Opinion of the International Searching Authority dated Jun. 23, 2021 for corresponding International Application No. PCT/FR2021/050368, filed Mar. 4, 2021.
(Continued)

*Primary Examiner* — Juan A Torres
(74) *Attorney, Agent, or Firm* — David D. Brush; Westman, Champlin & Koehler, P.A.

(57) ABSTRACT

A method for managing a phase for requesting pairing of a data processing device. The method includes the following steps in an entity external to the data processing device: detecting a pairing request phase from the data processing device; obtaining an elapsed duration linked to the pairing request phase; and requesting termination of the pairing phase beyond a given duration.

6 Claims, 1 Drawing Sheet

(51) Int. Cl.
*H04W 12/61* (2021.01)
*H04W 76/11* (2018.01)
*H04W 76/38* (2018.01)

(58) Field of Classification Search
USPC ............... 455/410, 414.1, 550.1; 340/825.22
See application file for complete search history.

(56) References Cited

U.S. PATENT DOCUMENTS

2016/0323283 A1* 11/2016 Kang ...................... H04L 63/08
2018/0302440 A1 10/2018 Hu et al.
2018/0359641 A1* 12/2018 Idnani ................... H04W 48/16
2019/0075464 A1* 3/2019 Gloanec .............. H04L 63/0236
2019/0289026 A1 9/2019 Kurian

OTHER PUBLICATIONS

Tran Khanh Dang et al., "The Meeting of Acquaintances: A Cost-efficient Authentication Scheme for Light-weight Objects with Transient Trust Level and Plurality Approach", arxiv.org, Cornell University Library, 201 Olin Library Cornell University Ithaca, NY 14853, Mar. 24, 2019 (Mar. 24, 2019), XP081157336.

International Search Report dated Jun. 15, 2021 for corresponding International Application No. PCT/FR2021/050368, iled Mar. 4, 2021.

Written Opinion of the International Searching Authority dated Jun. 15, 2021 for corresponding International Application No. PCT/FR2021/050368, filed Mar. 4, 2021.

* cited by examiner

[Fig. 1]
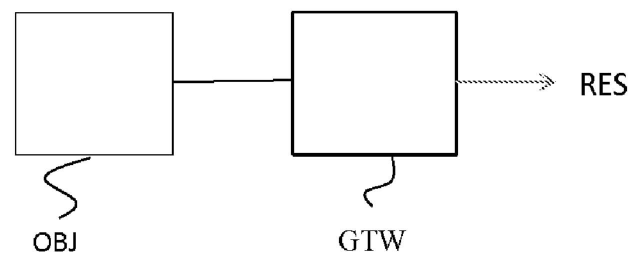
[Fig. 2]
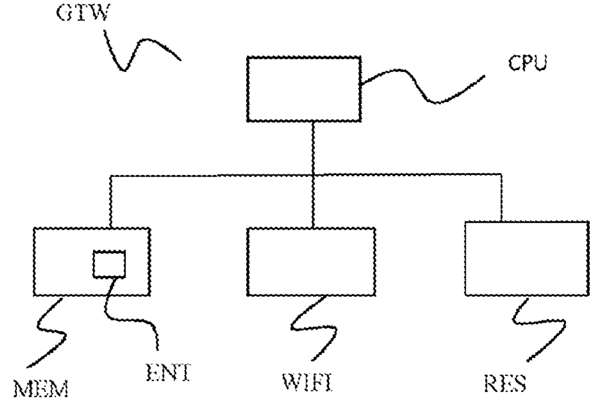
[Fig. 3]
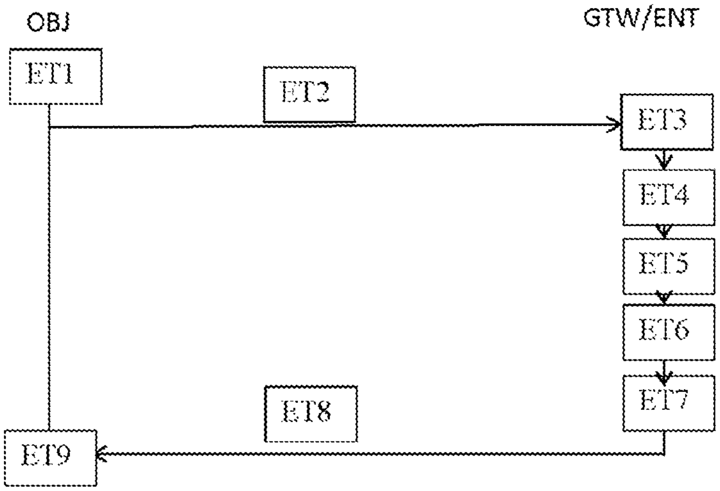

METHOD FOR MANAGING A PHASE FOR REQUESTING PAIRING OF DATA PROCESSING DEVICES

CROSS-REFERENCE TO RELATED APPLICATIONS

This Application is a Section 371 National Stage Application of International Application No. PCT/FR2021/050368, filed Mar. 4, 2021, which is incorporated by reference in its entirety and published as WO 2021/181030 A1 on Sep. 16, 2021, not in English.

TECHNICAL FIELD

The invention relates to the field of telecommunications.

The invention relates more particularly to a method for managing the pairing of a first data processing device with a second data processing device.

The first device chosen to illustrate the invention is a connected object.

It will be recalled that a connected object is a communicating device and is therefore capable of communicating with a communication network. The object may be equipped with sensors (for sensing temperature, humidity, etc.), a camera, a video camera, etc. and, due to its abilities to transmit data, may transmit captured data or multimedia content, for example, to another data processing device such as a processing server.

The second device chosen to illustrate the invention is a home gateway.

The invention is of course not limited to connected objects and to home gateways.

The invention is more generally applicable to all data processing devices.

BACKGROUND

Installing a new wireless connected object (such as a connected camera or a Wi-Fi connected bulb) requires prior pairing, for example with a home gateway. This pairing is essential since it makes it possible to be certain that the object that appears is actually the one that the user wishes to pair and not another object, for example that of a neighbor or a malicious third party.

This pairing request phase is a particularly sensitive time in the life of the object. Indeed, the pairing request phase is often a source of vulnerability, since the connection information is sometimes transmitted without security, for example without prior authentication.

This pairing request phase is usually limited in terms of time in order to reduce risks; indeed, it is estimated that the user who purchases an object will pair it within the first minutes or hours after it is powered on. It is therefore highly likely that the device that wishes to pair with the object within this time interval is a legitimate device. This limited-time pairing request phase provides some measure of security against fraudulent access.

For some objects, this limited-time pairing request phase is repeated for each electrical (re)start.

For other objects, the pairing request phase is permanently active throughout the life of the object. This unlimited duration is practical since it does not require any action from a user, for example pressing a button to activate the pairing request phase; it also makes it possible to perform pairing at any time. The problem linked to repeating pairing requests upon each electrical restart, or linked to an unlimited pairing request duration, is that the risk of fraud inevitably increases. A malicious third party may use the unlimited pairing duration, or the repeated pairing request phases, to attempt to take control of the object without the knowledge of the owner of the object. For example, if the object is a connected camera, the malicious third party in question may for example film the inside of the house using the camera without the knowledge of the legitimate user, for example the owner of the camera.

The invention aims to improve the situation.

SUMMARY

To this end, according to one functional aspect, the invention relates to a method for managing a phase of requesting the pairing of a data processing device, characterized in that it comprises the following steps in an entity external to the device:

- A step of detecting a pairing request phase originating from the data processing device;
- A step of obtaining an elapsed duration linked to the pairing request phase,
- A step of requesting stoppage of the pairing phase beyond a given duration.

According to the invention, a pairing request phase lasts a certain duration beyond which an entity requests stoppage of the pairing request phase. This pairing request duration is controlled by an entity external to the data processing device. The external entity is ideally installed in a home gateway, as will be seen below.

In other words, the duration of the pairing request phase is able to be customized and may be set by a device external to the data processing device.

As will be seen below, the entity is able to terminate the pairing request, for example by isolating the device in question so as to quarantine the object. The entity decides for example to terminate the pairing request when the duration of the pairing request phase has exceeded a threshold duration, the quarantining consisting in creating a specific access point, or specific subnetwork, called quarantine subnetwork.

The invention is of very particular interest for devices with a permanent pairing mode, that is to say one without a time limit. The invention is nevertheless applicable to devices offering a limited-time pairing mode. Indeed, the pairing mode duration that is chosen by default, for example by the manufacturer of the object, might not be suitable for the owner of the object, for example because it is too long.

As will be seen in the description, the request to stop the pairing request phase may take multiple forms.

According to a first particular mode of implementation of the invention, a stop request comprises a step of creating a specific connection identifier, comparable to a connection identifier for a device to be quarantined; the creation step is followed by a step of transmitting the connection identifier to the data processing device and a step of pairing the data processing device on the basis of the transmitted connection identifier. In this first mode, the actual stoppage of the pairing request ends by pairing the object. This first mode has the purpose of creating a specific access point, or subnetwork, for example in a home gateway; this specific access point is intended to quarantine a device in order to isolate it from other devices offering respective access points. This mode aims to prevent a data processing device, such as a connected object, from connecting to a network or subnetwork other than the one created for the quarantining. In other words, this first embodiment forces pairing between the data processing device and the subnetwork that is created in order to terminate the current pairing request originating from the object.

According to another, second particular mode of implementation of the invention, which may be implemented as an alternative or in addition to the previous ones, the created connection identifier is masked. Assuming that the entity is installed in a gateway, the latter thereby does not broadcast the created specific connection identifier to the devices located nearby. This mode prevents a legitimate device other than the data processing device from using it to pair with the quarantine subnetwork.

According to another, third particular mode of implementation of the invention, which may be implemented as an alternative or in addition to the previous modes, the created connection identifier is associated with a password. Only the data processing device targeted by quarantining is thereby able to establish a connection with the created connection identifier. This mode prevents another device from connecting to the created quarantine access point.

According to another, fourth particular mode of implementation of the invention, which may be implemented as an alternative or in addition to the previous modes, only one connection is possible with the specific connection identifier. This mode makes it possible to decline other connections other than the one established with the data processing device.

According to one hardware aspect, the invention relates to a management entity able to manage a pairing request phase of a first data processing device, characterized in that the entity comprises

- A detection module for detecting a pairing request phase originating from the device,
- An obtainment module for obtaining an elapsed duration linked to the pairing request phase,
- A stop module for stopping the pairing phase beyond a given duration. According to another hardware aspect, the invention relates to a home gateway including the entity described above.

According to another hardware aspect, the invention relates to a computer program able to be implemented on a management entity such as defined above, the program comprising code instructions that, when it is executed by a processor, performs the steps of the method that are defined above.

Finally, the invention relates to a data carrier on which at least one sequence of program code instructions for executing the method defined above has been stored.

The data carrier may be any entity or device capable of storing the program. For example, the carrier may include a storage means, such as a ROM, for example a CD-ROM or a microelectronic circuit ROM, or else a magnetic recording means, such as a hard disk. Moreover, the information carrier may be a transmissible carrier such as an electrical or optical signal, which may be routed via an electrical or optical cable, by radio or by other means. The program according to the invention may in particular be downloaded from a network such as the Internet. As an alternative, the information carrier may be an integrated circuit into which the program is incorporated, the circuit being designed to execute or to be used in the execution of the method in question.

Lastly, it should be pointed out here that, in the present text, the term “module” or “entity” may correspond equally to a software component or to a hardware component or to a set of software and hardware components, a software component itself corresponding to one or more computer programs or subroutines or, more generally, to any element of a program able to implement a function or a set of functions such as described for the modules in question. In the same way, a hardware component corresponds to any element of a hardware assembly able to implement a function or a set of functions for the module in question (integrated circuit, chip card, memory card, etc.).

BRIEF DESCRIPTION OF THE DRAWINGS

The invention will be better understood on reading the following description, which is given by way of example and with reference to the appended drawings, in which:

FIG. 1 shows a computer system on which an exemplary embodiment of the invention is illustrated.

FIG. 2 is a schematic view of the architecture of a home gateway according to one embodiment of the invention.

FIG. 3 illustrates one example of steps implemented within the context of a method according to one embodiment.

DETAILED DESCRIPTION OF ONE OR MORE EXEMPLARY EMBODIMENTS ILLUSTRATING THE INVENTION

FIG. 1 shows a data processing device OBJ able to access a communication network RES.

In our example, the data processing device is a connected object.

The object OBJ may be any type of device configured to access a communication network. The object OBJ may be a connected light bulb, a connected vacuum cleaner, a cell phone or other mobile communication terminal, such as a tablet or a laptop computer, a desktop computer or a domestic appliance able to establish a connection with the communication network RES.

In our example, the connected object is able to communicate with the communication network RES via an interface device GTW.

In our example, the communication network RES is the Internet and the interface device GTW is a home gateway or a router allowing the terminal of a user OBJ to access the Internet. Access to the communication network RES is provided by a communication network access provider (not shown in the figures).

FIG. 2 illustrates a home gateway GTW configured to implement the management method according to one particular embodiment of the invention.

According to this particular embodiment, the gateway GTW has the conventional architecture of a computer and comprises in particular a processor CPU (or microcontroller), a memory MEM storing an entity ENT. In our example, the entity ENT is a computer program that comprises instructions for implementing the steps of the management method that will be described below with reference to FIG. 3 when the program is executed by the processor CPU.

The gateway furthermore comprises a communication module referenced Wi-Fi in the figure and a module RES for communicating, respectively, with a local area network such as a Wi-Fi network and a wide area network such as an ADSL, fiber, etc. network. This module is able to receive and/or transmit data to and/or from the gateway GTW.

FIG. 3 illustrates the steps of the processing method according to a first embodiment of the invention.

In a step referenced ET1, the object OBJ creates a Wi-Fi® access point, whose SSID contains the suffix _AJ or the prefix AJ_.

In a second step ET2, the object OBJ publishes its SSID identifier. At this stage, devices located within the field of coverage of the object receive the SSID identifier.

In our exemplary embodiment, the connected object OBJ communicates by way of a communication protocol called AllJoyn®.

It will be recalled that, according to the AllJoyn® "Onboarding Service", an object wishing to communicate with a communication network has to publish a network, that is to say create a Wi-Fi® access point, whose SSID identifier (for "Service Set Identifier", in accordance with the IEEE 802.11 standard) contains a prefix AJ_ or a suffix _AJ. This access point may be secure or open. In our example, the connected object OBJ publishes a Wi-Fi® network "Lifi-A0_xxx_AJ".

In a third step ET3, the home gateway GTW continuously scans the radio exchanges in order to detect all equipments in a pairing request phase and transmitting their respective SSID identifiers.

In a fourth step ET4, the home gateway GTW detects a type of object in pairing mode, for example by detecting open Wi-Fi access points. For this purpose, the gateway detects publications of the type "Lifi-A0_xxx_AJ" coming from one or more connected objects. In our example, the gateway receives the SSID published by the object OBJ, specifically SSID xxx_AJ, and thereby detects an object in a pairing request phase. The gateway retrieves the address @MAC of this object.

The invention is of course not limited to the use of the AllJoyn® protocol; other techniques may of course be used to detect that an object is in a pairing request phase. For example, the home gateway may rely on a brand or an identifier of serial number type, known to be connected objects. For example, if an object broadcasts an SSID of the type "mini35000", 35000 may designate a serial number known to be a connected camera; an SSID of the type "Cam-xx" may be known by the entity to designate a connected object of connected camera type.

In a fifth step ET5, following detection of an object in a pairing request phase, the gateway GTW stores, in a persistent database, for example of ROM (Read Only Memory) type including EPROM, EEPROM, etc. memories, identification data such as the address of the one or more objects detected in a pairing request phase.

The gateway GTW stores for example the following parameters for a given object:

the address of the object, for example its address @MAC, the SSID identifier published by the object OBJ, etc.

It should be specified here that the Alljoyn protocol gives the gateway GTW the option of retrieving identification data from the object OBJ. For example, the gateway GTW, by way of the AllJoyn "About" service, obtains the manufacturer's reference of the object, along with its serial number; the gateway GTW, by way of the "Onboarding" service, obtains the MAC (for "Media Access Control") address of the connected object OBJ.

In a sixth step ET6, the home gateway GTW determines, for an object detected in a pairing request phase, a duration DA representative of an elapsed duration linked to the current pairing request phase for this object. A maximum duration Dmax is defined in the entity ENT, beyond which duration the gateway GTW acts on the object so as to modify the pairing request phase. The modification consists, in our example, in terminating the pairing request phase.

This elapsed duration may be, indiscriminately a duration that has elapsed since the detection of an object in a pairing request phase. For this purpose, the gateway has a time counter; and/or a duration that has elapsed since the start of the pairing request phase. In this case, the obtained duration DA may be provided by the object itself equipped with a time counter.

The elapsed duration may also be deduced from the time when the object under consideration was powered on. Indeed, some connected objects switch to pairing request mode as soon as they are powered on.

It should be specified here that the entity ENT is ideally installed in the home gateway GTW. However, the invention is not limited to this configuration, and the entity ENT may be located at a location other than in the gateway GTW, for example on a device (not shown) of the local area network of the home gateway GTW or on a device (not shown) connected to the network RES. The entity ENT could very well be located on the object in a secure memory region accessible only to an authorized person, for example the manufacturer of the object or a manager of the object, such as a telecommunications operator.

In a seventh step ET7, the gateway GTW requests stoppage of the pairing request phase if the duration Dmax is reached. The stoppage may be permanent or temporary.

In this seventh step ET7, the gateway GTW compares this duration DA to the duration Dmax.

As soon as Dmax is reached, in a fifth step ET5, the gateway GTW terminates the pairing request phase.

The pairing request phase may be stopped in several ways.

According to a first way, the gateway notifies the object asking it to stop the pairing. A stop module present in the object OBJ terminates the pairing request phase.

It is assumed here that only one pairing operation is possible with the network under consideration, the Wi-Fi network in our example.

According to a second way, the gateway GTW isolates the object OBJ. For this purpose, in our example, the gateway GTW creates a specific subnetwork with which the object will pair so as to isolate it and quarantine the object OBJ. For this purpose, the gateway creates an SSID identifier dedicated to the object for which pairing request stoppage is desired. As will be seen below, once the object paired to the gateway blocks access to the network RES. It will also be seen that access to the network RES may be authorized for a limited duration, for example to close the pairing phase.

In our example, the SSID identifier is called "BCK".

In an eighth step ET8, the gateway transmits, to the object OBJ, the Wi-Fi configuration data needed to establish a connection with the gateway, or more precisely with the created subnetwork called "BCK". In our example, the data are the SSID identifier called "BCK" and a password PW-BLK for the gateway. For this purpose, the home gateway HGW 10 may use the AllJoyn® Onboarding.ConfigWifi function (possibly secured via AllJoynSecurity 2.0) for secure and encrypted transmission of the Wi-Fi key and the associated password.

In this configuration, in a ninth step ET9, the object OBJ pairs with the gateway GTW using the specific identifier "BCK" and the dedicated password. Once the pairing is complete, the object stops transmitting pairing request messages.

This second way ensures that the object will not connect to an access point thereafter.

The method described above may be subject to variants:

According to one variant, once the object is connected to the subnetwork, the object checks that it actually has access to the Internet via the created access point "BCK" to complete its configuration and switch to normal mode. In this configuration, the access point "BCK" remains active for a sufficiently long time and connected to the Internet RES. This makes it possible to close the phase of requesting pairing between the object OBJ and the access point. This variant may be implemented only the first time in order to close the initial object pairing phase. Afterwards, the object could also be left connected without restarting the SSID BCK on the home gateway.

According to another variant, the SSID identifier of the subnetwork, called "BCK" in our example, is masked for devices other than the object. In other words, devices located within the radius of coverage of the gateway do not display "BCK" in the list of available networks. This variant prevents another device not affected by quarantining from using this quarantine subnetwork.

According to another variant, a password is defined to access the access point "BCK".

According to another variant, as soon as the object has paired on the access point "BCK", the gateway blocks any pairing attempt on this access point. This variant prevents multiple devices from being able to connect to the created access point "BCK".

In the case of only temporary pairing authorization, the gateway GTW may transmit a disconnection request (step E6) to the connected object OBJ upon expiry of the pairing authorization period, for example using the AllJoyn® Onboarding service. The connected object then disconnects from the temporary subnetwork that had been dedicated thereto. Calling the "Offboard" function makes it possible to automatically disconnect the object OBJ at the end of the period authorized for the pairing thereof.

In the third step ET3 described above, the entity ENT may also take into account the strength of the signal (RSSI) originating from the object in order to ensure that the object that it is being attempted to protect is actually that of the user and not that of a neighbor, for example. Confirmation may be requested from the user.

The third step ET3 may consume electrical energy. According to another variant, the entity ENT may activate this mode under certain criteria (upon request from the user, at regular time intervals, upon detection of entry to the user's home, etc.).

According to another variant, instead of creating a specific access point in order to stop the pairing request phase, the method may consist in transmitting a pairing stop command to the object. To implement this mode, the object comprises a processing module able to request stoppage of the pairing upon command.

In order to implement the method of the invention, the entity comprises

- A detection module for detecting a pairing request phase originating from the data processing device;
- An obtainment module for obtaining an elapsed duration linked to the pairing request phase;
- A stop module able to request stoppage of the pairing phase beyond a given duration.

Although the present disclosure has been described with reference to one or more examples, workers skilled in the art will recognize that changes may be made in form and detail without departing from the scope of the disclosure and/or the appended claims.

The invention claimed is:

1. A management method comprising:

managing a phase of requesting pairing of a data processing device, which is able to create an access point and to emit an access point identifier, wherein the managing is implemented by an entity external to the data processing device and comprises:

detecting a pairing request phase originating from the access point and a type of the access point; and for the access point identifier:

obtaining an elapsed duration linked to the pairing request phase; and requesting stoppage of the pairing request phase beyond a given duration, which comprises creating a specific connection identifier, transmitting the connection identifier to the data processing device and pairing the data processing device to the entity based on the transmitted connection identifier, said pairing having an effect of isolating the data processing device in a quarantine subnetwork.

2. The management method as claimed in claim 1, wherein the created connection identifier is masked.

3. The management method as claimed in claim 1, wherein the created connection identifier is associated with a password.

4. A management entity, wherein the management entity comprises:

a processor; and a non-transitory computer readable medium comprising instructions stored thereon which when executed by the processor configure the management entity to manage a phase of requesting pairing of a data processing device, which is able to create an access point and to emit an access point identifier, wherein the management entity is external to the data processing device and the managing comprises:

detecting a pairing request phase originating from the access point and a type of the access point; and for the access point identifier:

obtaining an elapsed duration linked to the pairing request phase; and requesting stoppage of the pairing request phase beyond a given duration, which comprises creating a specific connection identifier, transmitting the connection identifier to the data processing device and pairing the data processing device to the entity based on the transmitted connection identifier, said pairing having an effect of isolating the data processing device in a quarantine subnetwork.

5. A home gateway comprising the management entity as defined in claim 4.

6. A non-transitory computer readable medium on which at least one sequence of program code instructions has been stored, which when executed by a processor of a management entity configure the management entity to perform a method for managing a phase of requesting pairing of a data processing device, which is able to create an access point and to emit an access point identifier, the management entity being external to the data processing device and the method comprising:

detecting a pairing request phase originating from the access point and a type of the access point; and for the access point identifier:

obtaining an elapsed duration linked to the pairing request phase; and requesting stoppage of the pairing request phase beyond a given duration, which comprises creating a specific connection identifier, transmitting the connection identifier to the data processing device and pairing the data processing device to the entity based on the transmitted connection identifier, said pairing having an effect of isolating the data processing device in a quarantine subnetwork.

* * * * *